Patented Jan. 15, 1924.

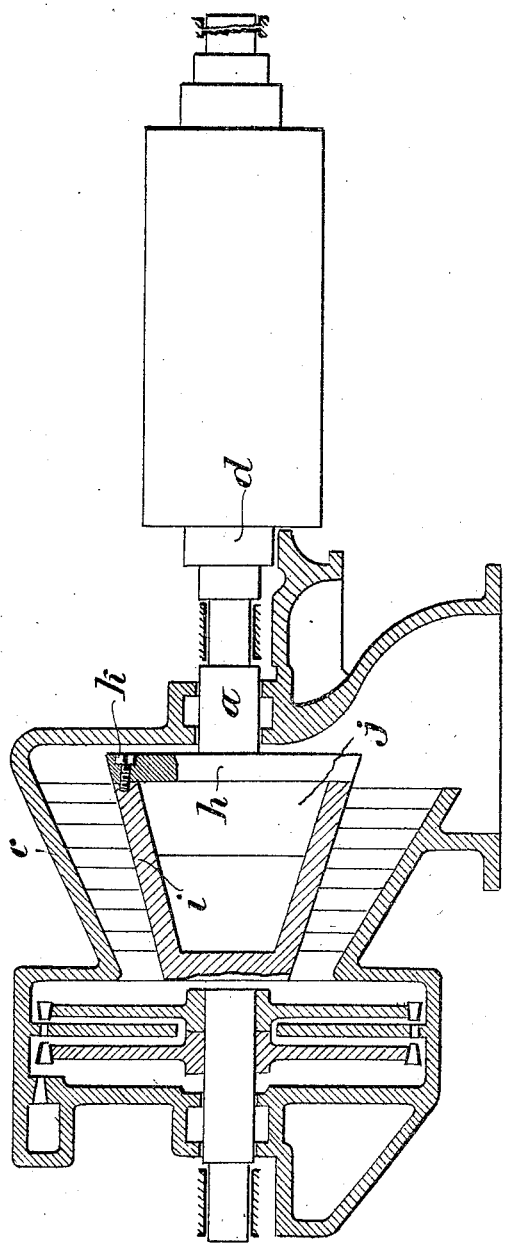

1,480,772

UNITED STATES PATENT OFFICE.

FRANZ LÖSEL, OF BRUNN, CZECHOSLOVAKIA.

TURBINE COUPLING.

Application filed October 29, 1920. Serial No. 420,553.

*To all whom it may concern:*

Be it known that I, FRANZ LÖSEL, a citizen of the Czechoslovak Republic, residing at Brunn, Czechoslovakia, have invented certain new and useful Improvements in Turbine Couplings (for which I have filed applications in Austria, July 16, 1919; Hungary, Aug. 12. 1919; Czechoslovakia, Aug. 14, 1919; and Poland, Aug. 6, 1919), of which the following is a specification.

My invention refers to couplings and more especially to a device for coupling steam or gas turbines with the shaft of the driven machine, for instance with the shaft of an electric generator or the like.

Hitherto the rotor drum of gas or steam turbines used to be coupled with the shaft of the electric generator, or other machine, by fitting the shaft of the rotor drum, which was continued outside the turbine casing, with one half of a rigid or elastic coupling either behind a second bearing of the shaft or, on the other hand, also directly adjoining the stuffing-box, the said half of the coupling being made to engage with a corresponding half of a rigid or elastic coupling fitted directly on the shaft of the driven machine as, for instance, the shaft of the dynamo.

Hitherto the shaft of the power generator was always extended outwards through the last stuffing-box of the turbine and then coupled either rigidly or elastically with the driven shaft.

Apart form the great constructional length and the necessity of having to employ large base plates, this type of construction possesses the further disadvantage of offering no stiffening for the driven shaft, so that the critical numbers of revolution are influenced in an unfavourable manner.

All these drawbacks are avoided by the coupling device according to my invention, which substantially consists in the coupling taking place within the turbine casing and ahead of the last stuffing-box, and in the point of coupling being situated at the extreme end of the rotor drum generating the moment of torque, a considerable stiffening of the driven shaft thus being achieved through the large moment of inertia of the drum, in consequence of which the possibility is given of influencing the critical numbers of revolution in such a way as to keep them off as far as possible from the number of revolutions chosen for the working of the machine.

In the drawings affixed to this specification and forming part thereof, a turbine plant embodying my invention is illustrated diagrammatically by way of example. Referring to the drawings, the driven shaft, for instance, the shaft $d$ of a dynamo, is widened at one end to form a large flange $h$ and continued longitudinally so far as to come into direct contact with the rotor $i$ which generates the power, a continuation $j$ of the flange $h$ preferably projecting into the hollow space of the drum of the rotor. The coupling flange $h$ is fastened to the end of the rotor drum $i$ by means of screws $k$. Thus the working medium delivers the power generated to the vanes on the drum, whence it is transmitted directly to the driven shaft $d$ by the flange $h$ of the coupling.

By means of the high flange $h$ it is possible to accord a very extensive degree of stiffening to the driven shaft $d$ and thus to achieve a considerable raising of the critical numbers of revolutions, owing to the moment of inertia of the hollow drum $i$ being turned to account. For, under ordinary circumstances, the driven shaft, or shaft of the dynamo respectively, can only be provided with the necessary stiffness required for steady running with difficulty. This is, however, achieved in the case of the arrangement according to my invention, as the stiff drum $i$ itself is employed directly for stiffening the driven shaft.

Further advantages of this coupling according to my invention, consist in the shorter constructional length, furthermore in its being possible to omit the base-plate or to reduce its size, and finally in the fact that one of the most expensive jobs, i. e. the making and fitting in of the coupling which entails a vast amount of fitter's work, is done away with, whilst the coupling according to my invention merely requires grinding in the conical end of the shaft of a dynamo into the drum part of the shaft of the steam turbine.

I claim:

1. In turbine driven machinery in combination, a turbine drum, a casing surrounding said drum, a driven machine beside said casing, the unsupported end of the shaft of said machine extending into said casing and a rigid connection between said end and said drum within said casing.

2. In turbine driven machinery in combination, a conical turbine drum, a casing surrounding said drum, a driven machine beside said casing, the shaft of said machine extending into said casing, a flange of great diameter on the end of said shaft adjoining said drum and a conical projection on said flange extending into and closely fitting in said drum.

In testimony whereof I affix my signature.

FRANZ LÖSEL.

Witnesses:
MORITZ SCHMEKA,
STEFAN ROSHNY.